United States Patent [19]

Tuteja

[11] Patent Number: 5,413,190

[45] Date of Patent: May 9, 1995

[54] ENGINE MOUNT FOR BLIND INSTALLATION

[75] Inventor: Balbir S. Tuteja, Rochester Hills, Mich.

[73] Assignee: The United States of America as represented by the Secretary of the Army, Washington, D.C.

[21] Appl. No.: 273,439

[22] Filed: Jul. 5, 1994

[51] Int. Cl.⁶ ............................................. B60K 8/00
[52] U.S. Cl. ................................... 180/291; 248/570; 248/638; 248/639
[58] Field of Search ................. 180/291, 294; 248/638, 248/639, 550, 570

[56] References Cited

U.S. PATENT DOCUMENTS 4,813,513  3/1989  Le Salver et al. ................... 180/291
5,078,230  1/1992  Hasuike ................................ 180/291

Primary Examiner—Mitchell J. Hill
Attorney, Agent, or Firm—Peter A. Taucher; David L. Kuhn

[57] ABSTRACT

A remotely operated mechanism is used to mount an engine in a compartment where connections between the engine and compartment are difficult to access or see. The mechanism comprises a mounting adapter which is fit to the engine and which mates to a mounting block connected to the floor of the compartment. The adapter has a ridge, an adapter bore through the ridge, and a facial flat on either side of the ridge. The mounting block has a channel whose sides closely receive the ridge, and has two block bores along a common axis. Mounting flats on the block interface with the adapter's flats when the block and adapter are fully engaged. To fasten the adapter to the mounting block, a plunger is biased to translate in one of the block bores until a keeper of the plunger fits closely both in the ridge bore and the other block bore. The plunger position is controlled by a cable connected thereto, and a locking device on the cable releasably fixes the cable in a selected position.

8 Claims, 4 Drawing Sheets

ENGINE MOUNT FOR BLIND INSTALLATION

GOVERNMENT USE

The invention described here may be made, used and licensed by or for the U.S. Government for governmental purposes without paying me a royalty.

BACKGROUND AND SUMMARY

Placement of engine assemblies in land combat vehicles has design aspects not normal for other vehicles. First, the engine assembly of a land combat vehicle must be in an enclosed, armored compartment to protect it from enemy fire. Second, interior space of combat vehicles is at a greater premium than vehicles such as cargo trucks and passenger cars. As a result, there typically is little space in combat vehicles between an engine assembly and panels of a compartment where the engine is located. When the engine assembly is lowered into the compartment, the lack of space makes it difficult to access or see engine mounts on the floor of the compartment. Consequently, installation of engine assemblies in combat vehicles can require much time, labor and skill.

I address the above problem of installing engine assemblies by using a remotely operated engine mount mechanism. This mechanism comprises a mounting adapter fixed to the engine and mated to a mounting block on the floor of the engine compartment. The adapter has a cross-sectionally tapered ridge and the mounting block has a complimentary channel to closely receive the ridge. The adapter has a facial flats adjacent the ridge that interface with like flats on the block when the adapter engages the block. The mounting block has two block bores on an axis intersecting the channel, and the adapter's ridge has a bore which aligns with the block bores when the block and adapter engage. A plunger in one block bore is biased to translate through the ridge bore and into the other block bore, so the adapter and block are interlock to fix the engine to the compartment floor. Plunger translation is effected by a cable connected thereto, and a releasable locking device on the cable retains the cable and plunger in a selected position.

DETAILED DESCRIPTION

Figure 1:
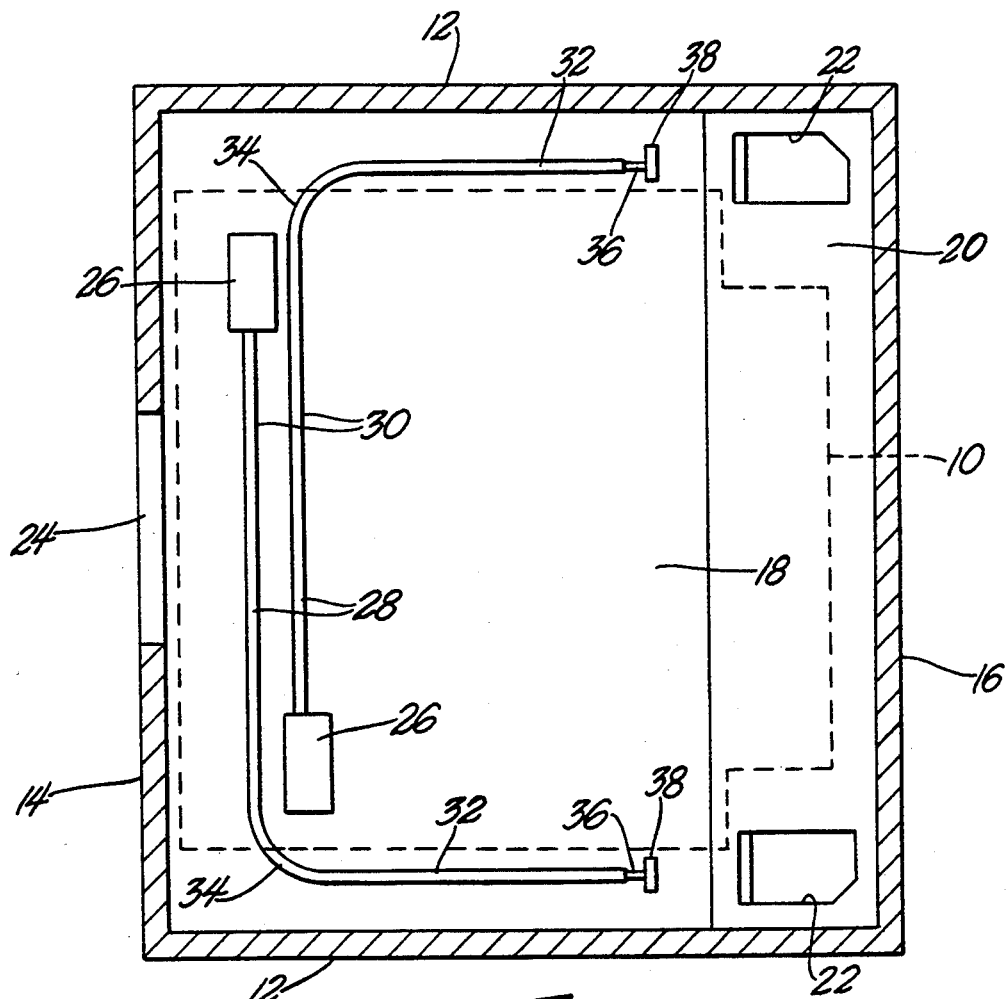
FIG. 1 is a plan view of a vehicle engine compartment with the compartment walls shown in section and an engine assembly represented by dashed lines.
Figure 2:
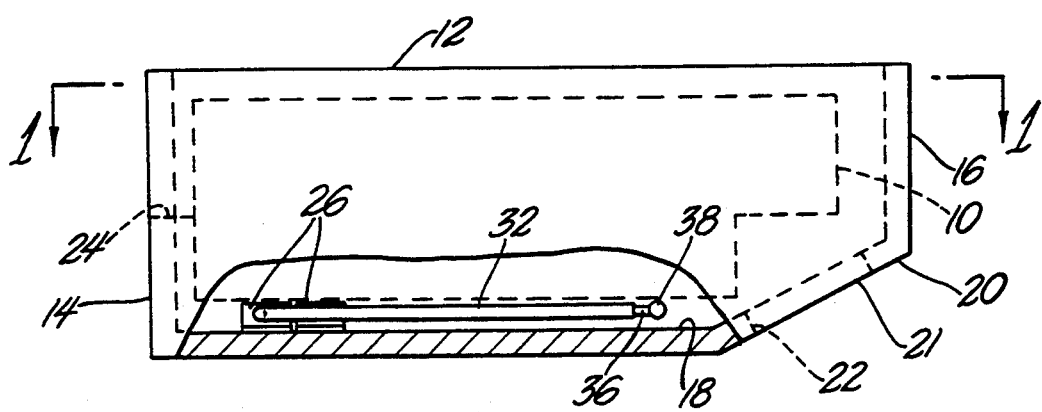
FIG. 2 is a side elevational view of the engine compartment shown in FIG. 1.

Shown schematically by dashed lines in FIGS. 1 and 2 is an engine assembly 10 within an armored vehicle's engine compartment comprised of side walls 12, end walls 14 and 16, and floor 18. Floor extension 20 defines a pair of access openings 22 and wall 14 defines a yoke 24 through which a drive train member (not shown) or other component may extend from its connection to engine assembly 10. The walls, floor and floor extension are welded together to form an integrated unit so as to maximize the compartment's strength and resistance to intrusion by flying projectiles. A closure cover (not shown) typically is bolted onto the compartment and is unbolted to gain access to the engine compartment. The exterior 21 of floor extension 20 and openings 22 face down and are at the rear of the vehicle. It is considered more likely that a tank or like combat vehicle will receive enemy fire from the front and sides, and less likely that the vehicle will receive fire from the rear. Hence the location of floor extension 20 and openings 22 at the rear of the vehicle minimizes chances of a projectile hitting them. The downward angle of exterior 21 minimizes chances of penetration by a projectile should floor extension 20 be hit.

Fixed to floor 18 beneath engine assembly 10 are engine mount assemblies 26, which are shown only in outline form in FIGS. 1 and 2. Once engine assembly 10 is lowered into the engine compartment, assemblies 26 are inaccessible and are hidden from view. Sheathed actuator cables 28 have transverse sections 30 leading along floor 18 from each mount assembly toward a respective wall 12, where cables 28 define right angle bends 34 toward aft end wall 16. Longitudinally oriented sections 32 of cables 28 run along walls 12 between the respective wall 12 and engine assembly 10. Between cable sections 32 and apertures 22 are unsheathed cable sections 36 to which are fixed "T" handles 38, the handles being sized and positioned so that a person can easily reach through apertures 22 to manipulate the handles. Translation of handle 38 toward or away from end wall 16 causes translation of a piston-like member or plunger in mount assembly 26, as will be detailed later. Via known design and structure, rotating handle 38 in one angular direction relative to the axis of section 32 will lock the cable in place relative to the cable's sheath, so that neither the handle nor the piston-like member can be translated. Of course, subsequent rotation of the handle in the opposite rotational direction unlocks the cable relative to its sheath and thereby allows the aforementioned translation.

Figure 3:
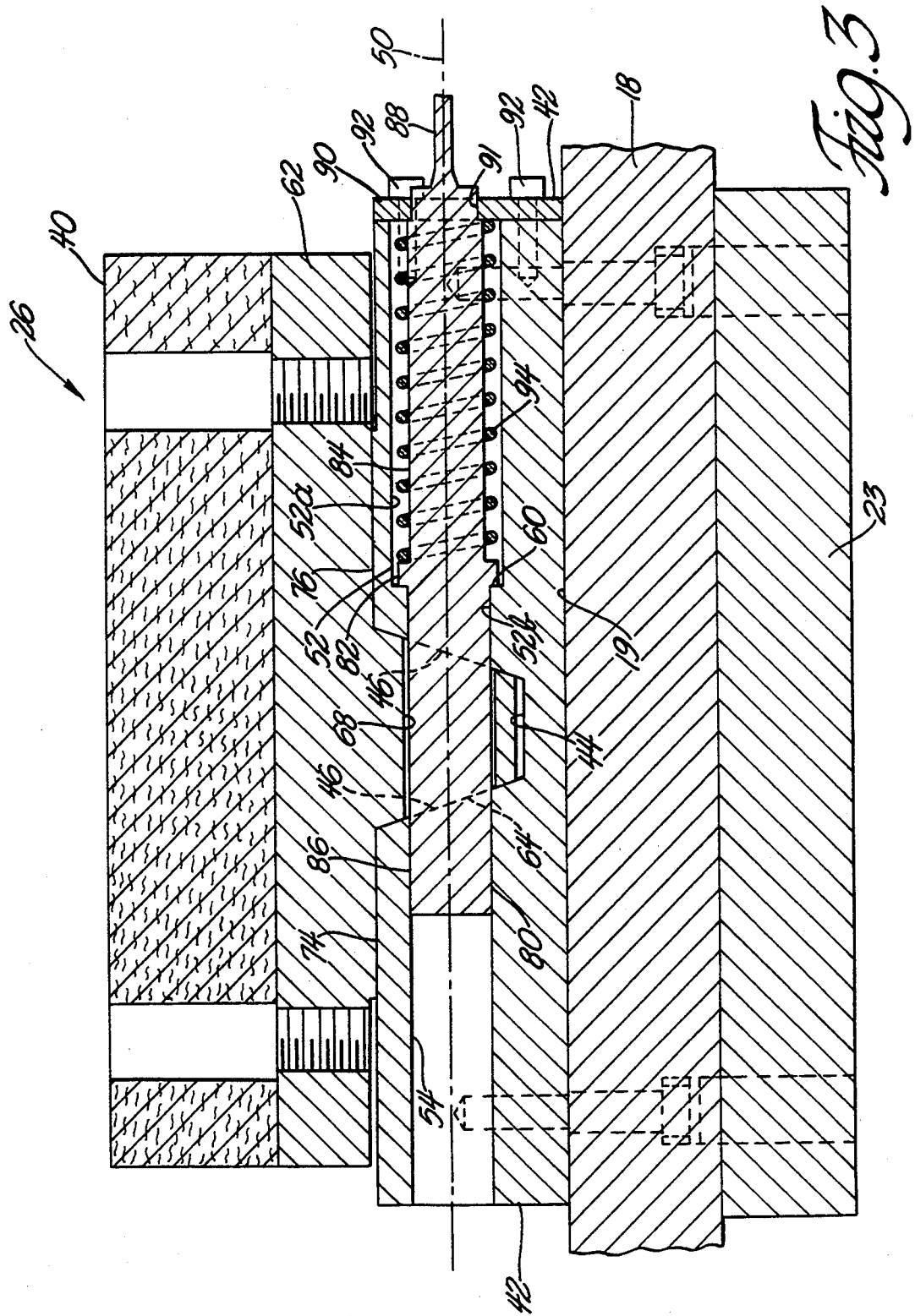
FIG. 3 is a sectional view of an engine mount assembly.
Figure 4:
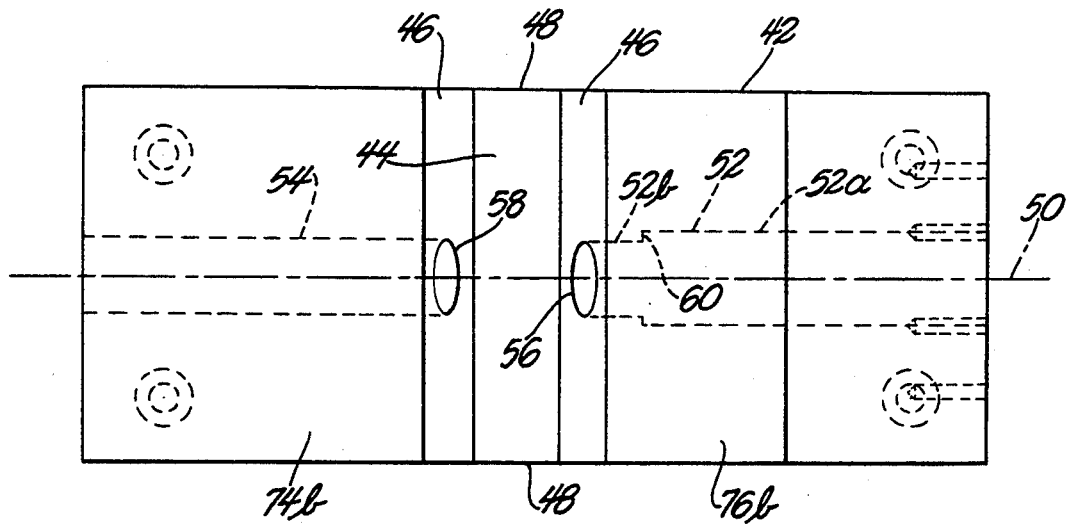
FIG. 4 is a top elevational view of a mounting block that is part of the engine mount assembly.

FIG. 3 shows a detail sectional view of engine mount assembly 26 fixedly mounted in face-to-face relation to flat reference surface 19 on floor 18. On the under side of floor 18 is floor support member 23, which reinforces the floor in the region of reference surface 19. The lower portion of assembly 26 is a mount block 42 bolted upon reference surface 19 and defining a channel 44 across its width, block 42 being shown separately in FIG. 4. Channel 44 has flat smooth channel walls 46, which are divergingly slanted, and channel 44 is open at either of its ends 48. Block 42 defines two elongate bores 52 and 54 both centered on common axis 50 perpendicular to channel 44, the bores defining openings 56 and 58 the channel. Shoulder 60 of bore 52 divides bore 52 into a larger diameter portion 52a and a smaller diameter portion 52b. Bore 54 has the same diameter as portion 52b.

Figure 5:
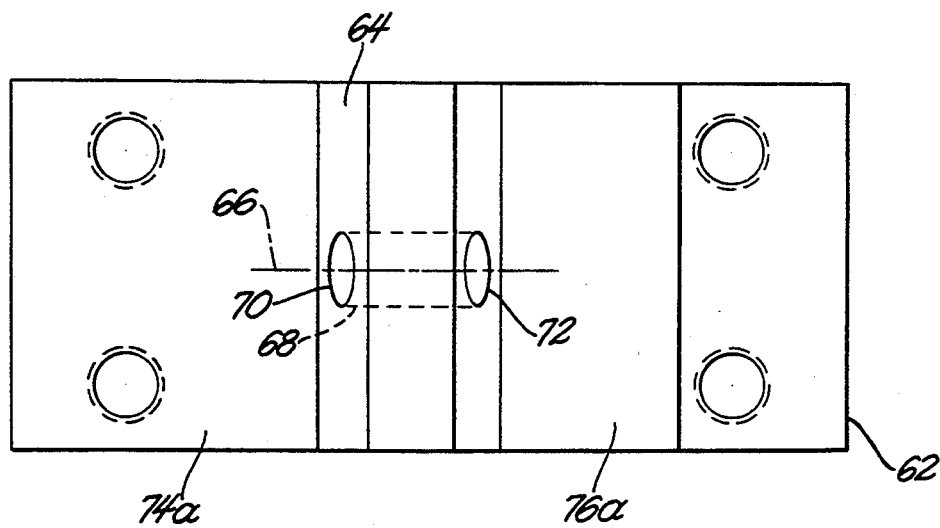
FIG. 5 is a bottom elevational view of an adapter that is part of the engine mount assembly.

Fit matingly to mounting block 42 is an adapter 62 (FIGS. 3 and 5) which is affixed to elastomeric pad 40 on the bottom of engine assembly 10 (not shown in FIG.

3). Adapter 62 has a transverse ridge 64 whose sides bear facially against walls 46 of channel 44 and is preferably equal in length to the channel. When seated in channel 44, ridge 64 is slightly spaced from the bed of the channel. Normal to ridge 64 is bore 68, which passes through ridge 64 along axis 66 (FIG. 5), and which is alignable with common axis 50 by sliding ridge 64 in and along channel 44. Bore 68 has a slightly larger diameter than bore portion 52a and bore 54, and bore 68 has apertures 70 and 72 that register with respective openings 58 and 58 in channel 44 of block 42. Adapter 62 has reference flats 74a and 76a which facially bear against complimentary reference flats 74b and 76b on block 42, all of these flats being parallel to floor 18.

As seen in FIG. 3 there is a plunger 80 translatable in block 42 along common axis 50. At an intermediate section of plunger 80 is an annular collar 82 that separates plunger shank 84 from cylindrical keeper 86, collar 82 fitting closely with shoulder 60 and fitting loosely with larger diameter portion 52a of bore 52. Flats 74a, 74b, 76a and 76b mate at respective interfaces 74 and 76 in FIG. 3, whereby the load of engine mount assembly 10 transmits through the interfaces and not through ridge 64 to channel 44 so that plunger 80 never bears the load of the engine mount assembly. Collar 82 retains one end of a coil spring 94 wound about shank 84 and it is preferred that spring 94 be axially compressed in the FIG. 3 position, which shows the spring's least compressed state. Neither plunger 80 nor spring 94 is under any load from the engine assembly 10. The opposite end of spring 94 is retained by closure plate 90 affixed to block 42 by suitable threaded members 92, plate 90 having an aperture 91 to allow sliding passage of shank 84 therethrough. Keeper 86 has a generally straight cylindrical shape that fits closely with smaller diameter portion 52b of bore 52, fits loosely with bore 68 of ridge 64, and fits closely with bore 54 of block 42. Optionally, keeper 86 and bore zones it contacts may have slight, complimentary tapers of, say, 15°, to ease the keeper's passage through bore 68 if adapter 62 slightly misaligns with block 42 when first seated thereon.

At the exposed end of shank 84 is stem 88 connecting to cable 28 such that translating handle 38 (FIG. 1) left or right causes axial translation of plunger 80. Pulling handle 38 to the right in FIG. 1 translates plunger 80 to the right in FIG. 3, thereby compressing spring 94. Optionally, the bias of spring 94 will be strong enough to overcome friction affecting cable 28 and plunger 80. Such bias will cause plunger 80 to always revert to its FIG. 3 position unless there is a mechanical lock on handle 38.

Figure 6:
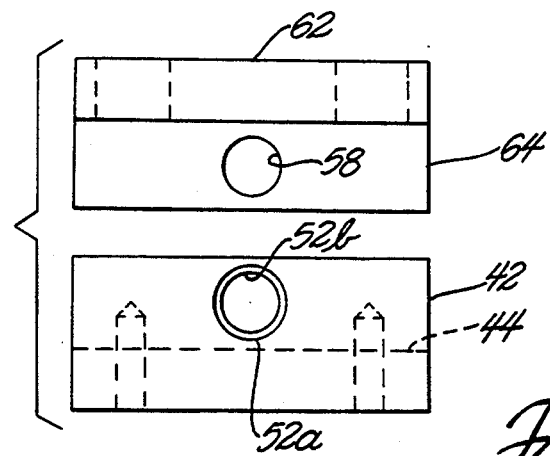
FIG. 6 is an end elevational view of the mounting block and the adapter.
Figure 7:
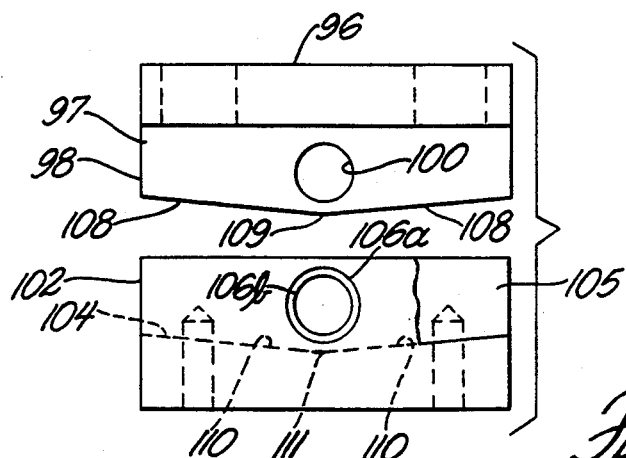
FIG. 7 is an end elevational view of alternate embodiments of the mounting block and the adapter.

FIG. 7 shows end views of slightly modified versions of mounting block 42 and adapter 62, the end views of the unmodified versions being shown in FIG. 6 for convenient comparison. Mounting block 102 in FIG. 7 is the same as mounting block 42 except that the FIG. 7 mounting block has a channel 104 that differs from channel 44 of mounting block 42. Note that bores 106a and 106b in FIG. 7 exactly correspond to bores 52ba and 52b in FIG. 6. Channel 104 has two channel bed flats 110 that form a shallow "V" and these flats adjoin at line 111 at the center of the channel's bed.

Adapter 96 in FIG. 7 is in all respects the same as adapter 62 in FIG. 6 except that ridge 98 in FIG. 7 differs from ridge 64. Ridge 98 has two ridge flats that form a shallow "V" congruent with channel 104, flats 108 meeting at ridge central line 109. The sides 99 of ridge 98 will fit closely with the side walls 105 of channel 104. Ridge bore 100 in FIG. 7 is the same as ridge bore 58 in FIG. 6. When adapter 96 is lowered onto mounting block 102, flats 108 bear on flats 110, ridge 98 will tend to center in channel 104 such that lines 109 and 111 will align adjacently with each other.

Figure 8:
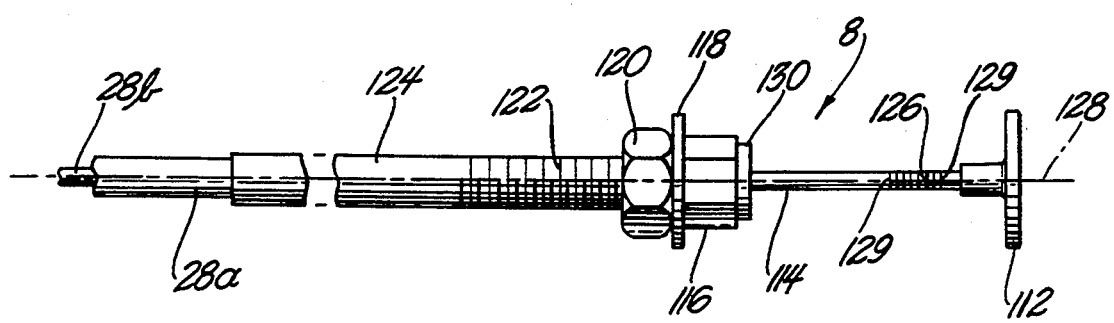
FIG. 8 is a top elevational view of a modified cable lock assembly that can be used as part of my engine mounting device.

FIG. 8 shows a mainly conventional cable lock assembly 8 that is used to lock cable line 28b in place once cable line has been translated to the desired position. "T" handle 112 is affixed to a rigid shaft or cable terminus 114 that runs into tube 124 and therein connects with cable line 28b. Nut 116, lock washer 118 and nut 120 are on an externally threaded portion 122 at one end of tube 124. Cable sheath 28a and cable line 28b extend from the other end of tube 124. As is conventional, translation of handle 112 along axis 128 causes cable 28b to translate relative to tube 124 and sheath 28a, whereas turning handle about axis 128 locks or unlocks cable line 28b in its position relative to tube 124. Ultimately, the handle's translation effects translation of plunger 80 (FIG. 3) along axis 50. The modification of otherwise conventional assembly 8 is the addition of primary gauge line 126 and secondary gauge lines 129 on shaft 114. Gauge line 126 is positioned on shaft 114 such that line 126 will be at surface 130 of nut 116 when plunger 80 is fully into its locking position, which is the plunger's fully leftward position in FIG. 3. Line 126 is thus an indicator showing whether engine assembly 10 is locked to mounting block 42. One of secondary gauge lines 129 could be used instead of line 126 should line 126 become inaccurate subsequent to cable tensioning or like events.

I do not desire to be limited to the exact details of construction or method shown herein since obvious modifications will occur to those skilled in the relevant arts without departing from the spirit and scope of the following claims.

I claim:

1. A mechanism to blindly mount an engine, comprising:

an adapter connected to the engine;
   a ridge on the adapter;
   a ridge bore through the ridge;
   an adapter flat on the adapter;
   a mounting block in the compartment having a channel shaped to closely receive the ridge, the block defining block bores communicated to the channel and aligned along a common axis;
   a mounting flat on the block faced toward the adapter flat;
   a plunger translatable in one of the block bores, at least a portion of the plunger receivable in the ridge bore and another of the block bores;
   means for biasing the plunger toward the other block bore;
   a cable connected to the plunger;
   means for translating the plunger by manipulating the cable, the translating means having means to lock the cable in a selected position.

2. The mechanism of claim 1 further comprising:
   an end of the cable remote from the plunger;
   means at the end of the cable for visually indicating a plunger position within the mounting block.

3. The mechanism of claim 1 further comprising:
   a shoulder in the one block bore;
   an annular collar on the plunger axially facing the shoulder,
   a shank of the plunger extending from the collar;
   a removable closure plate fastened to the mounting block at an opening of the one block bore, the plate defining a plate aperture through which slides the shank;

wherein the biasing means is a spring along the shank continuously compressed between the collar and the closure plate.

4. The mechanism of claim 1 wherein:

the channel comprises two flat elongate bed portions disposed normal to the common axis and oblique to each other, whereby the bed portions form a shallow "V";

the ridge comprises two complimentary elongate flat portions normal to the common axis and oblique to each other;

the channel and ridge have a relative position where each of the bed portions bear on a respective one of the complimentary portions.

5. The mechanism of claim 1 wherein:

the channel has sidewalls diverging away from the block;

the ridge has flat sides bearing facially on the side walls when the ridge seats in the channel.

6. The mechanism of claim 1 wherein:

the portion of the plunger is a generally cylindrical element having a section tapered away from an end of the plunger connected to the cable;

the other block bore and the ridge bore are tapered to closely receive the section.

7. A mechanism for blindly mounting an engine in a vehicle compartment having limited access to engine mounting components in the compartment, comprising:

an adapter connected to the engine;

an elongate tapered ridge on the adapter;

a ridge bore defined through the ridge along a bore axis intersecting the ridge;

an adapter flat on the adapter faced away from the engine;

a mounting block in the compartment, the mounting block defining an open ended, flared channel shaped to receive the ridge;

a mounting flat on the mounting block bearing facially with the adapter flat when the adapter seats on the mounting block;

first and second mounting block bores aligned on a common axis intersecting the channel, the block bores registering with the ridge bore when the adapter seats on the mounting block;

a plunger translatable in the first mounting block bore along the common axis;

an axially extending shank of the plunger in the first mounting block bore;

an axially extending keeper of the plunger having a keeper portion configured to fit in the second mounting block bore;

a continuously compressed spring in the first block bore biasing the plunger toward the second block bore;

a cable connecting to the plunger and running to a site in the engine compartment remote from the mounting block;

a panel of the engine compartment at the site defining an access aperture;

means at the site for translating the plunger by manipulating the cable, the translating means having means to lock the cable in a selected position.

8. A mechanism for blindly mounting an engine in a vehicle compartment wherein the compartment includes opposed ends, sides connected between the opposed ends and a floor connected to the sides and ends, whereby access to engine mounting components in the compartment is limited, the mechanism comprising:

an adapter fastened to the engine;

a flat surface of the adapter parallel to the floor and faced away from the engine;

an elongate ridge at the flat surface on the adapter, the ridge having an essentially trapezoidal cross section tapered away from the flat surface;

a ridge bore defined through the ridge along a bore axis perpendicularly intersecting the ridge;

a mounting block in the compartment equal in length to the ridge, the mounting block defining an open ended flared channel shaped to receive the ridge;

a flat face of the mounting block parallel to the flat surface of the adapter, the face bearing upon the flat surface when the adapter seats on the mounting block;

first and second mounting block bores aligned on a common axis perpendicularly intersecting the channel;

a larger diameter portion of the first mounting block bore;

a smaller diameter portion of the first mounting block bore;

a shoulder adjacently between the smaller diameter portion and the larger diameter portion of the mounting block bore;

a plunger translatable in the first mounting block bore along the common axis;

an annular collar on the plunger;

an axial face of the collar opposed to the shoulder;

a shank of the plunger in the first bore extending axially from the collar;

a keeper of the plunger extending axially from the collar away from the shank, at least a part of the keeper configured to fit closely in the second mounting block bore;

a closure plate on the mounting block at the larger diameter portion of the first mounting block bore;

a coil spring on the shank continuously compressed between the closure plate and the shoulder;

a cable connected to the plunger running to a site in the engine compartment remote from the mounting block;

a panel of the engine compartment at the site defining an access aperture;

means at the site for translating the plunger by manipulating the cable, the translating means having means to lock the cable in a selected position, whereby the plunger is locked in a chosen position.

* * * * *